(12) United States Patent
Royyuru et al.

(10) Patent No.: US 8,523,053 B2
(45) Date of Patent: Sep. 3, 2013

(54) ENABLING CONSUMER CHOICE ON CONTACTLESS TRANSACTIONS WHEN USING A DUAL-BRANDED PAYMENT INSTRUMENT

(75) Inventors: Vijay K Royyuru, Norristown, PA (US); Daniel J Ruppe, Longwood, FL (US)

(73) Assignee: First Data Corporation, Greenwood Village, CO (US)

( * ) Notice: Subject to any disclaimer, the term of this patent is extended or adjusted under 35 U.S.C. 154(b) by 429 days.

(21) Appl. No.: 12/203,842

(22) Filed: Sep. 3, 2008

(65) Prior Publication Data
US 2010/0051685 A1   Mar. 4, 2010

(51) Int. Cl.
*G06F 19/00* (2011.01)
(52) U.S. Cl.
USPC .......................................... 235/379; 235/380
(58) Field of Classification Search
USPC ................. 235/379, 380, 441, 449, 492, 493, 235/383, 487; 340/10.1, 10.4, 10.41, 10.42
See application file for complete search history.

(56) References Cited

U.S. PATENT DOCUMENTS

| | | | |
|---|---|---|---|
| 7,631,810 B2 * | 12/2009 | Liu et al. ...................... | 235/451 |
| 2004/0068472 A1 * | 4/2004 | Sahota et al. .................. | 705/64 |
| 2004/0087338 A1 | 5/2004 | Natsuno | |
| 2006/0000900 A1 * | 1/2006 | Fernandes et al. ............ | 235/380 |
| 2007/0135164 A1 | 6/2007 | Lee | |
| 2008/0162361 A1 * | 7/2008 | Sklovsky et al. ............... | 705/65 |
| 2008/0167961 A1 * | 7/2008 | Wentker et al. ................ | 705/14 |

FOREIGN PATENT DOCUMENTS

| | | |
|---|---|---|
| KR | 10-2003-0033859 A | 5/2003 |
| KR | 10-2006-0005821 A | 1/2006 |

OTHER PUBLICATIONS

Mastercard Paypass, "Tap & Go!", obtained online at http://mastercard.com/us/personal/en/aboutourcards/paypass/index.html on Sep. 18, 2009, 1994-2009, 1 page.
Mastercard Paypass, "What is Paypass?", obtained online at http://www.mastercard.com/us/personal/en/aboutourcards/paypass/index.html on Sep. 18, 2009, 1994-2009, 1 page.
Mastercard Paypass, "How to Tap", obtained online at http://www.mastercard.com/us/personal/en/aboutourcards/paypass/how_to_tap.html on Sep. 18, 2009, 1994-2009, 1 page.
PCT International Search Report and Written Opinion mailed Apr. 12, 2010; International Application No. PCT/US2009/055182, 13 pages.

* cited by examiner

*Primary Examiner* — Daniel St. Cyr
(74) *Attorney, Agent, or Firm* — Kilpatrick Townsend & Stockton LLP

(57) ABSTRACT

The embodiments presented herein provide for systems and methods for allowing different types of transactions, e.g., credit or debit transactions, over different payment networks, e.g., Visa or STAR networks, using contactless payment devices. In embodiments, a merchant and/or consumer can select if he or she wants a debit or credit transaction. The merchant point-of-sale (POS) device can process these choices and transmit the request to the contactless payment device. In embodiments, the contactless payment device includes two or more applications (one for credit transactions and one for debit transactions) for conducting transactions and transmitting the requested information to the merchant POS device. The merchant POS device can then use the information received from the contactless payment device to complete the transaction over the requested network.

16 Claims, 8 Drawing Sheets

ENABLING CONSUMER CHOICE ON CONTACTLESS TRANSACTIONS WHEN USING A DUAL-BRANDED PAYMENT INSTRUMENT

BACKGROUND

When a user makes a purchase at a retail location, the consumer generally can choose the form of payment. For example, the consumer may choose to conduct an electronic transaction that is either a debit or a credit transaction. The point-of-sale device can read information from a payment card to facilitate either of these electronic transactions.

Consumers are now adopting contactless payment devices that do not require the swiping of credit cards or other cards. Unfortunately, the contactless payment devices do not have the ability to allow for a user to choose their desired type of transaction. Rather, contactless payment devices generally only allow a certain type of transaction, for example, either a credit transaction or a debit transaction. This limitation is frustrating for users and can be problematic for the merchants who may prefer other forms of transactions.

It is in view of these and other considerations not mentioned herein that the embodiments of the present disclosure were envisioned.

BRIEF SUMMARY

Embodiments presented herein provide for systems and methods for allowing different types of transactions using contactless payment devices. In embodiments, a user can select if he or she wants a debit or credit transaction. The merchant point-of-sale (POS) device can transmit the request to the contactless payment device. In embodiments, the contactless payment device includes two or more applications for conducting transactions and transmits the requested information to the merchant POS device. The merchant POS device can then use the information received from the contactless payment device to complete the transaction.

BRIEF DESCRIPTION OF THE DRAWINGS

The embodiments of the present disclosure are described in conjunction with the appended figures.

Figure 1:
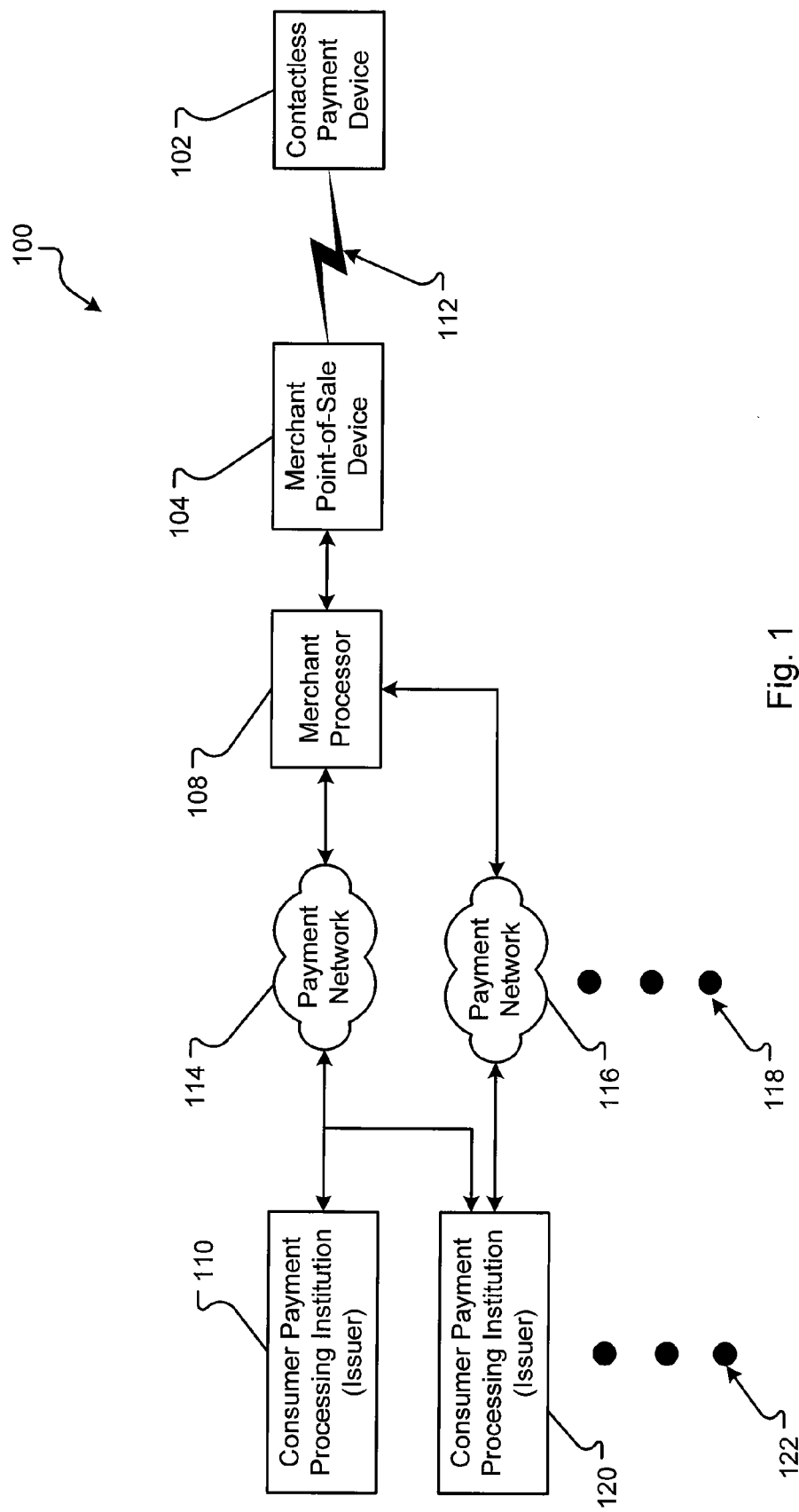
FIG. 1 is a block diagram of an embodiment of an electronic transaction processing system having one or more payment networks to process the transactions.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

An example describing some of the facets of the embodiments described herein may better inform the reader before setting out the specific embodiments. A consumer may go to a grocery store and decide to buy a loaf of bread. The consumer may choose to pay for the bread by using a self-service checkout. To begin the transaction, the user may select a "checkout" option on a screen of a cash register. The consumer may scan the UPC code for the bread. Then, the consumer may decide to use his or her contactless payment device (for example, Visa's payView device). The contactless payment process may allow the user to choose which payment network to use for a transaction (e.g., VISA, STAR, etc.).

In embodiments, the consumer may tap the contactless payment device on a reader. The cash register can read information from the contactless payment device. This information may be related to a "credit" transaction. The "credit" transaction would use one of the various payment networks (for example, Visa). The user may then be prompted to enter his or her own choice on the touch screen of the cash register. The user may choose to use a "debit" transaction. The debit transaction may use a different payment network (for example, STAR) than a credit transaction. Further, the consumer may be required to enter a PIN rather than sign for the transaction. To complete the transaction, the cash register may ask the consumer to "re-tap" the contactless payment device.

The consumer can again tap the contactless payment device on the reader. However, during this tap, the cash register can read information for a "debit" transaction. The information and the PIN are compiled and sent over the STAR network to the issuing bank or other issuing institution. The issuing institution authorizes the transaction and sends the authorization back to the cash register. The cash register completes the transaction, gives the receipt to the consumer, and the consumer leaves with the purchased bread.

These types of transactions were not possible previously. Consumers could only use one type of transaction (generally a credit transaction) and one payment network because the contactless payment devices only provided data for one type of transaction and the merchant cash registers only read one type of transaction data. Embodiments presented herein provide contactless payment devices that allow different types of transactions and provide merchant point-of-sale (POS) devices that can read or interact with the novel contactless payment devices to retrieve different types of transaction data.

An embodiment of a system 100 for providing electronic payment for a retail service or good from a contactless payment device 102 is shown in FIG. 1. A contactless payment device 102 is a device that allows for contactless payment for a retail service or good. In embodiments, the contactless payment device 102 allows a consumer to conduct an electronic transaction (for example, a credit transaction or a debit transaction) without the need to swipe a credit card or a debit card. For example, the contactless payment device may be VISA's payWave contactless application. In embodiments, the contactless payment device is a near field communication (NFC) component for communicating with NFC payment sensors. The NFC component may be a radio frequency identification device (RFID) or other type device that can send and receive information associated with a transaction. For example, the NFC component can be the PN531 transmission module offered by NXP Semiconductors, Eindhoven, Netherlands.

The first communications channel 112 provides communications between the merchant POS device 104 and contactless payment device 102. The first communications channel 112 may be any type of communications system including wireless, wired, or other communication system. In one embodiment, the first communications channel 112 is a wireless communication channel, and, in some embodiments, is a NFC channel. If a wireless communication channel, the first communication channel can be Bluetooth®, 802.11g, or other wireless system. In embodiments, the communications channel is a radio frequency system that allows a consumer to bring the contactless payment device 102 within close proximity of the merchant POS device 104 to establish communications. The bringing the contactless payment device 102 within close proximity of the merchant POS device 104 may be referred to as a "tap" of the contactless payment device 102.

The merchant POS device 104, in embodiments, is a device for completing a transaction for goods or services with a merchant. The merchant POS device 104 is operable to receive communications from and send communications to the contactless payment device 102. Further, the merchant POS device 104 is operable to receive communications from and send communications to a merchant processor 108. In embodiments, the merchant POS device 104 communicates with the merchant processor 108 over a communications channel. The communications channel may be wireless and the merchant POS device 104 communicates using a wireless network. Examples of merchant POS devices 104 may include, but are not limited to, a cash register, a self-service checkout device, a video rental system, etc. In alternative embodiments, one or more portions of the communications channel between the merchant POS device 104 and the merchant processor 108 includes wired media, for example, a LAN, WAN, the Internet, a telephone system, etc.

The merchant processor 108, in embodiments, is an acquiring processor, a merchant acquirer, and/or other entity that processes credit or debit authorizations on behalf of a merchant. In embodiments, the merchant processor 108 associates with two or more payment networks 114 and/or 116 to conduct electronic transactions, for example, credit, debit, stored value, etc. The merchant processor 108 may communicate authorization requests and receive authorizations or declinations of payment for a merchant over one of several payment networks 114 and/or 116 (e.g., STAR, CIRRUS, VISA® or MASTERCARD®). There may be more or fewer payment networks 114 and/or 116 as represented by the ellipses 118.

In embodiments, a merchant processor 108 sends an authorization request over one of several payment networks 114 and/or 116 to a consumer payment issuing institution or an issuing processor acting on behalf of the issuing institution 110 or 120. Each payment network 114 and/or 116 can interface with two or more consumer payment issuing institutions 110 and/or 120, as indicated by ellipses 122. The consumer payment issuing institution 110, in embodiments, is a financial institution that approves transactions for a consumer and sends authorizations to the merchant processor 108. After an authorization is received, the transaction can be completed by the merchant POS device 104.

In an example, a consumer selects a good to purchase at a grocery store. The consumer brings the good to a cash register that is the merchant POS device 104. The information for the good is acquired. For example, the universal purchase code (UPC) is scanned by a UPC reader, and the purchase information, the type of good, purchase price, etc., associated with the UPC is retrieved from a database. In an embodiment, the consumer uses his or her merchant POS device 104 to start a credit or debit transaction. In an alternative embodiment, the consumer begins a credit or debit transaction by tapping the contactless payment device 102 onto a reader of the merchant POS device 104. The merchant POS device 104 sends a signal to the contactless payment device 102 to request credit or debit information. The contactless payment device 102 retrieves the information and sends the information to the merchant POS device 104.

The merchant POS device 104 receives the transaction information. In embodiments, the transaction information is presented to the consumer on the merchant POS device 104 for approval. In embodiments, the consumer enters a signature or personal identification number (PIN) for the transaction. The merchant POS device 104 can compile and append the transaction information to the credit or debit information received from the contactless payment device 102. The combined information is, in embodiments, encrypted and sent to the merchant processor 108.

The merchant processor 108 receives the payment and transaction information. In embodiments, the merchant processor 108 sends an authorization request to the consumer payment issuing institution 110 over one of the payment networks 114 and/or 116. The payment networks 114 and/or 116 used is determined by the type of credit or debit transaction requested by the user. The consumer payment issuing institution 110 may then receive the authorization request and issue an authorization to the merchant processor 108. In embodiments, the merchant processor 108 sends the authorization to the merchant POS device 104, which completes the transaction.

Figure 2A:
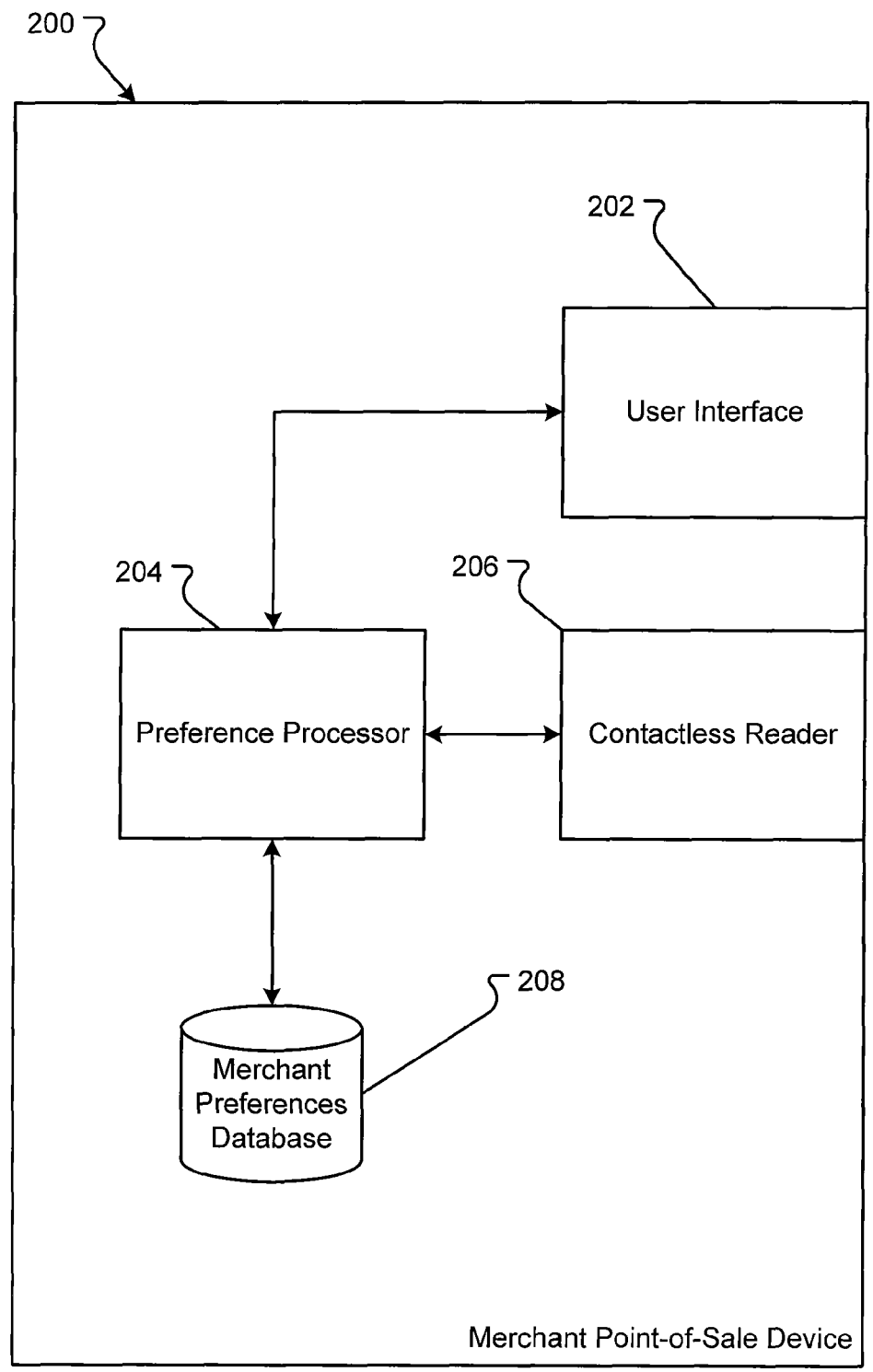
FIG. 2A is a block diagram of an embodiment of the hardware for a merchant POS device.
Figure 2B:
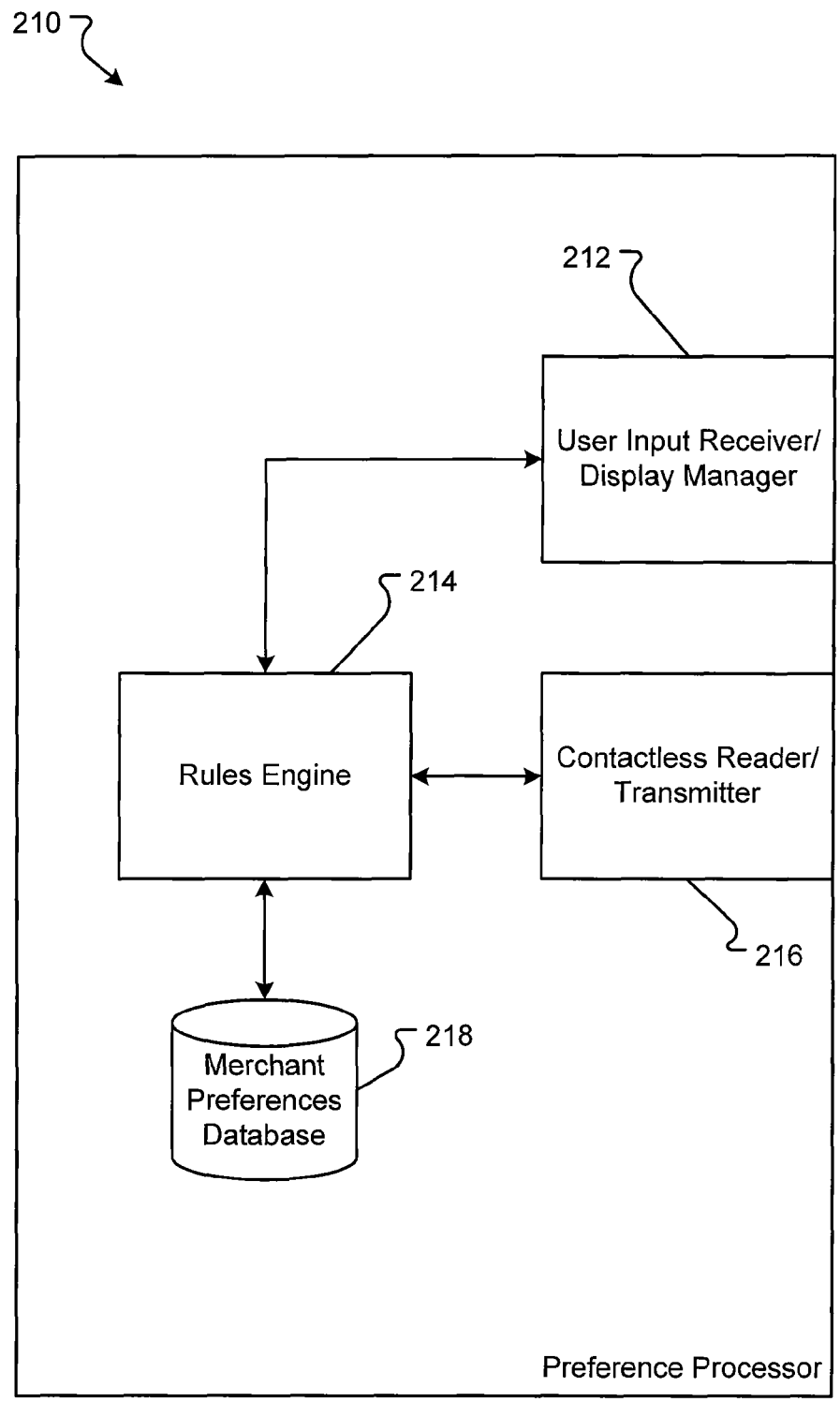
FIG. 2B is a block diagram of an embodiment of the software for a merchant POS system.

An embodiment of a novel merchant POS device 200 is shown in FIGS. 2A and 2B. In embodiments, the merchant POS device 200 is the same or similar to the merchant POS device 104 (FIG. 1). The merchant POS device 200 comprises one or more of a user interface 202, a preference processor 204, a contactless reader 206, and/or a merchant preferences database 208. The merchant POS device 200 can be a computer system as described in conjunction with FIG. 6.

The user interface 202, in embodiments, is a display and/or a device or system to receive consumer inputs and/or provide a display of information to the consumer. For example, the display is an LCD or plasma screen and includes a keyboard or touch screen to receive user inputs. The contactless reader 206 is a software and/or system that can communicate with the contactless payment device 102 (FIG. 1). The contactless reader 206, in embodiments, is an NFC compliant interface, which may be radio frequency, Bluetooth, infrared, ultraviolet, 802.11g, or other technology. In embodiments, the contactless reader 206 not only reads payment information from the contactless payment device 102 (FIG. 1) but also can send signals to the contactless payment device 102 (FIG. 1). The contactless reader 206 can receive a request from the preference processor 204 and forward the request to the contactless payment device 102 (FIG. 1).

The preference processor 204 is hardware, software, or hardware and software for processing the payment transaction. The preference processor 204 allows a user to select a type of payment (e.g., credit or debit) to pay for retail services using the merchant POS device 200. The payment information, in embodiments, includes a credit card number, a debit card number, a PIN, an account number, a password, payer authentication information, or other information required to pay for a retail service or good. Part of the information is the users choice of paying using a credit or debit transaction. Depending on the choice made by the consumer and the type of contactless payment device, the merchant processor 108 (FIG. 1) will send the authorization over one of the two or more payment networks 114 (FIG. 1) and/or 116 (FIG. 1). The preference processor 204, in embodiments, interacts with the user interface 202 to allow the user to select which account or payment options (e.g., debit or credit) the user desires.

In an alternative embodiment, a merchant also provides a preference to the type of transaction (e.g., debit or credit) used. The merchant's preference may be stored in the merchant preferences database 208. The merchant preferences database 208 can be any hardware, software, or hardware and software for storing information about the merchant's preferences for types of transactions. The merchant preferences also affect the decision of the merchant processor 108 (FIG. 1) to send the authorization over one of the two or more payment networks 114 (FIG. 1) and/or 116 (FIG. 1). The merchant POS device 200 can include one or more other components not shown in FIG. 2A or 2B.

An embodiment of a novel preference processor 210, similar to or the same as preference processor 204 (FIG. 2A) in the merchant POS device 200 (FIG. 2A), is shown in FIG. 2B. In embodiments, the one or more components shown in FIG. 2B are software modules, software components, code, etc., for completing the functions described herein. The user interface 212, in embodiments, provides or renders one or more display screens for the user interface device 202 (FIG. 2A). The user interface 212 can also receive, translate, interpret, or react to consumer inputs from the user input devices, for example, the keyboard or the touch screen. In embodiments, user interface 212 provides a display screen requesting a user to choose between a credit or debit transaction. The user can enter the choice on a user input device which is received by the user interface 212 and provided to the rules engine 214.

The contactless reader/transmitter 216 is a novel software and/or system that can communicate with the contactless payment device 102 (FIG. 1) and the rules engine 214. Unlike current contactless readers which can only receive data, the contactless reader/transmitter 216 is operable to receive data and send one or more signals to the contactless payment device 102 (FIG. 1). The contactless reader/transmitter 216, in embodiments, receives an identifier from the rules engine 214 identifying a type of application data 315 (FIG. 3) needed for the transaction. On the next tap of the contactless payment device 102 (FIG. 1), the contactless reader/transmitter 216 sends the identifier to the contactless payment device 102 (FIG. 1). The contactless payment device 102 (FIG. 1) can receive the identifier and send back the requested application data 315 (FIG. 3) to the contactless reader/transmitter 216. The contactless reader/transmitter 216 forwards the application data 315 (FIG. 3) to the rules engine 214 or other processor to complete the transaction.

In embodiments, the rules engine 214 interfaces with a merchant preferences database 218. The merchant preferences database 218 is software the stores data in a storage medium and retrieves the data from the storage medium. The merchant preferences database 218 can respond to requests from the rules engine 214 to store or retrieve data. A merchant can provide one or more preferences as to the type of transaction (e.g., debit or credit) or payment network 114 or 116 used for the transaction. The merchant's preferences may be stored by the merchant preferences database 218.

The rules engine 214, in embodiments, is a software process that determines what payment network 114 or 116 to use for a transaction. The rules engine 214 can use the merchant's preferences, the consumer's choice, and other factors to determine what payment network 114 or 116 to use for the transaction. The rules engine 214, in embodiments, communicates the preference for application data 315 (FIG. 3) to the contactless reader/transmitter 216 and receives the data returned by the contactless payment device 102 (FIG. 1). In embodiments, the rules engine 214 requests information from the consumer through the user interface 212 and receives replies for consumer preferences. The rules engine 214 can accumulate the information and forward the information to the merchant processor 108 (FIG. 1) to request transaction authorization over the determined payment network 114 or 116.

Figure 3:
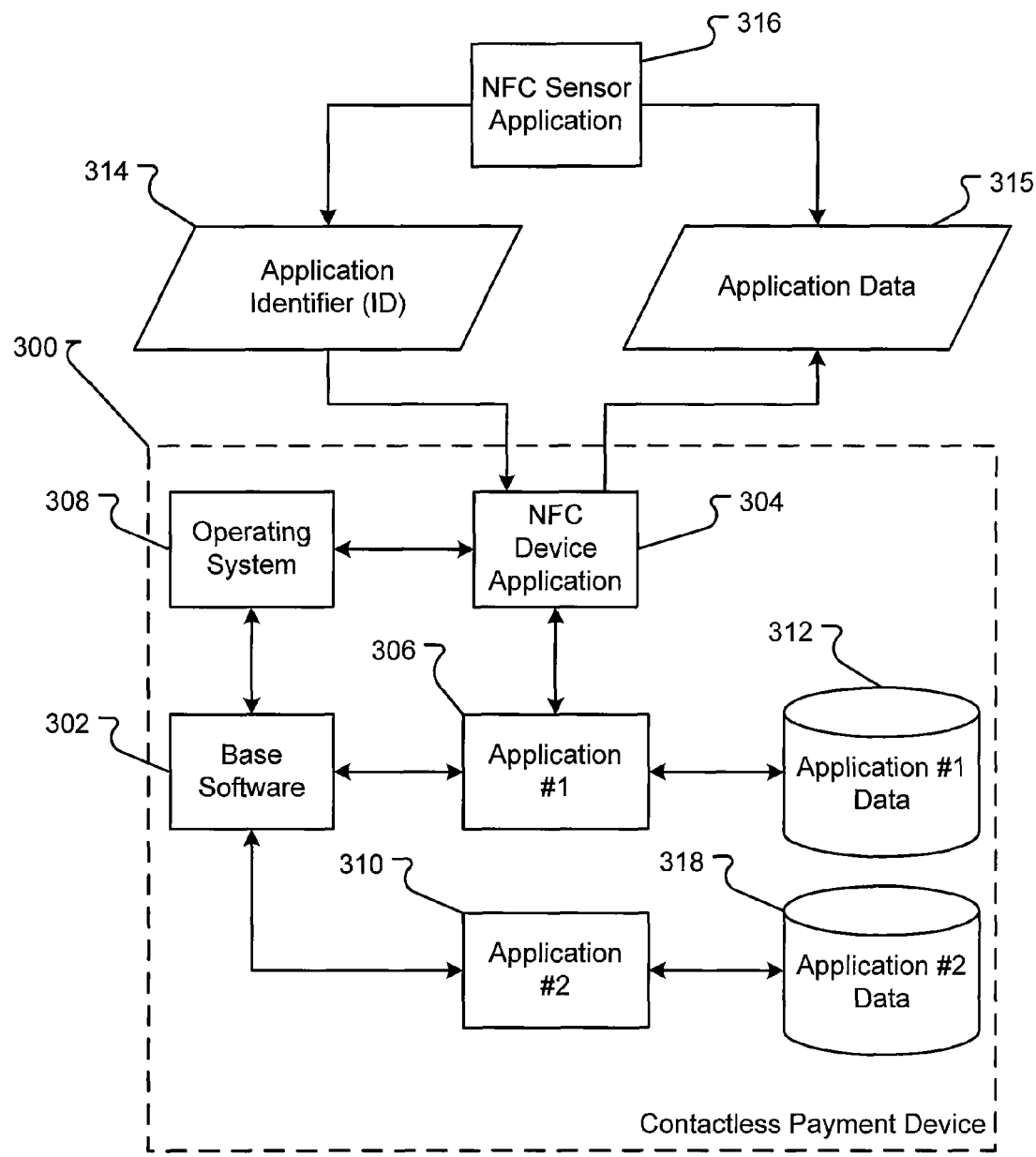
FIG. 3 is a block diagram of an embodiment of the software for a contactless payment device.

An embodiments of a novel contactless payment device 300 having one or more components is shown in FIG. 3. In embodiments, the components represent one or more hardware, software, or hardware and software modules or applications. The one or more applications may be executed in a processor of an RFID chip set. The contactless payment device 300, in embodiments, comprises an operating system 308, two or more mobile wallet applications 306 and/or 310, an NFC device application 304, a base software application 302, and/or two or more application data databases 312 and/or 318.

The operating system 308, in embodiments, is the software that controls one or more other applications and provides access to hardware components. In embodiments, the operating system 308 initializes, instantiates, and/or configures the applications 306 and/or 310, the base software 302, and/or the NFC device application 304. The operating system 308 can receive one or more signals from the NFC device application 304 and forward the signals to the base software 302.

The NFC device application 304 may be any component or data used to communicate payment data 315 to or receive application identifiers 314 from the an NFC sensor application 316 in a merchant POS device 104 (FIG. 1). The NFC device application 304 can both receive and transmit signals. In embodiments, the NFC device application 304 executes in a processor or other hardware of the NFC hardware component. The NFC device application 304 may be under the control of the operating system 308. Communication between the NFC device application 304 and the NFC sensor application 316 can provide the payment data 315 to the NFC sensor application 316 and provide application identifiers 314 to the base software 302. Some previous contactless payment devices may only send data. Embodiments of the NFC device application 304 to send and receive data.

The NFC sensor application 316 can be any software executed in the NFC sensor of the merchant POS device 104 (FIG. 1). In embodiments, the NFC sensor application 316 is the same or similar to the contactless reader/transmitter software 216 (FIG. 2B). The NFC sensor application 316 may include one or more software components for exchanging payment data 315 used to complete a transaction with the contactless payment device 300. In embodiments, the NFC sensor application 316 provides application data identifiers 314 to the contactless payment device 300.

In embodiments, the novel contactless payment device 300 includes modified or new base software 302. Base software 302 can receive the application identifier 314 from the operating system 308 or the NFC device application 304. The base software 302, in embodiments, determines to which application 306 or 310 the application identifier 314 is associated. In one embodiment, the base software 302 stores the associations between the identifiers and the applications 306 or 310 and searches for the identifier to determine the association. Upon determining the application 306 or 310 associated with the identifier, the base software 302 can pass the request for application data 315 to one of the applications 306 or 310. Previous contactless payment devices only included a single application and did not need to determine which application needed to be contacted to obtain data.

In embodiments, the contactless payment device 300 includes two or more applications 306 and/or 310. The applications 306 and/or 310 are software that provides payment data for a type of transaction. For example, application #1 306 would provide an account number, VISA payment network information, account holder information, issuer bank information, etc. for a credit transaction. Application # 2 310 can provide the same account number or a different account number, STAR payment network information, account holder information, issuer bank information, etc. for a debit transaction. Thus, for each type of transaction, in embodiments, there is an associated application. When the merchant preference or the user's choice requires one type of transaction, the application identifier 314 for the application related to that type of transaction is provided to the contactless payment device 300. The contactless payment device 300 can then retrieve the information from the application associated with the identifier. In embodiments, the data provided by the applications is stored and retrieved from an application database 312 and/or 318.

The applications 306 and/or 310 can store or extract application data 315 from an application database 312 and/or 318, which may be stored in a storage medium of the contactless payment device 300. The application database 312 and/or 318 can include information about the user (the user's name, address, phone number, email address, etc.), information about payment types for the user (account numbers, expiration dates, stored value accounts, gift card numbers, checking account numbers, other account information), security information (passwords, login credentials, etc.), issuing bank information, and/or any other information needed to transact business with the NFC sensor application 316. The applications 306 and/or 310 can manage the information in the application database 312 and/or 318.

Figure 4A:
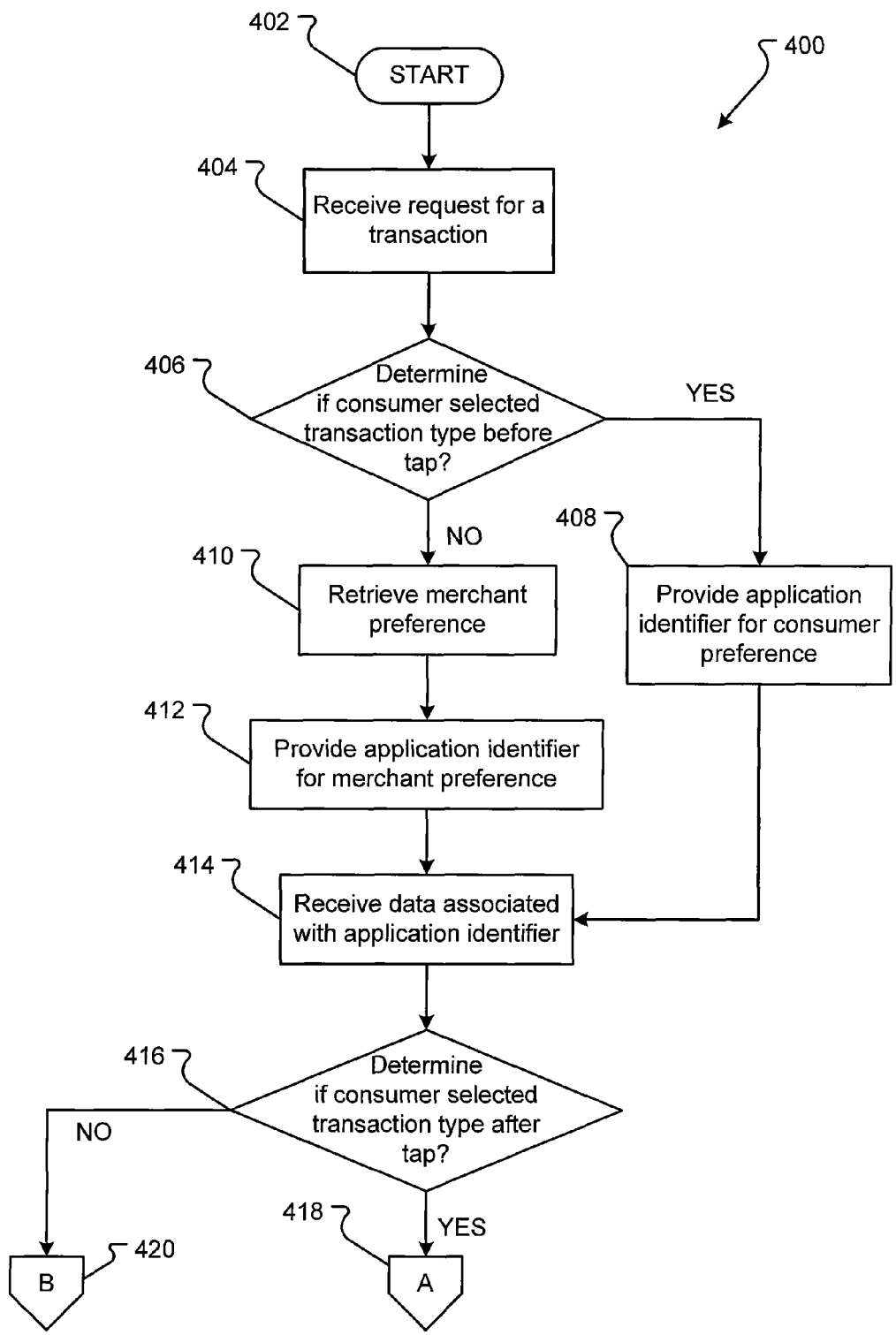
FIG. 4 is a flow diagram of an embodiment of a method for processing an electronic transaction having the option of two or more payment networks.
Figure 4B:
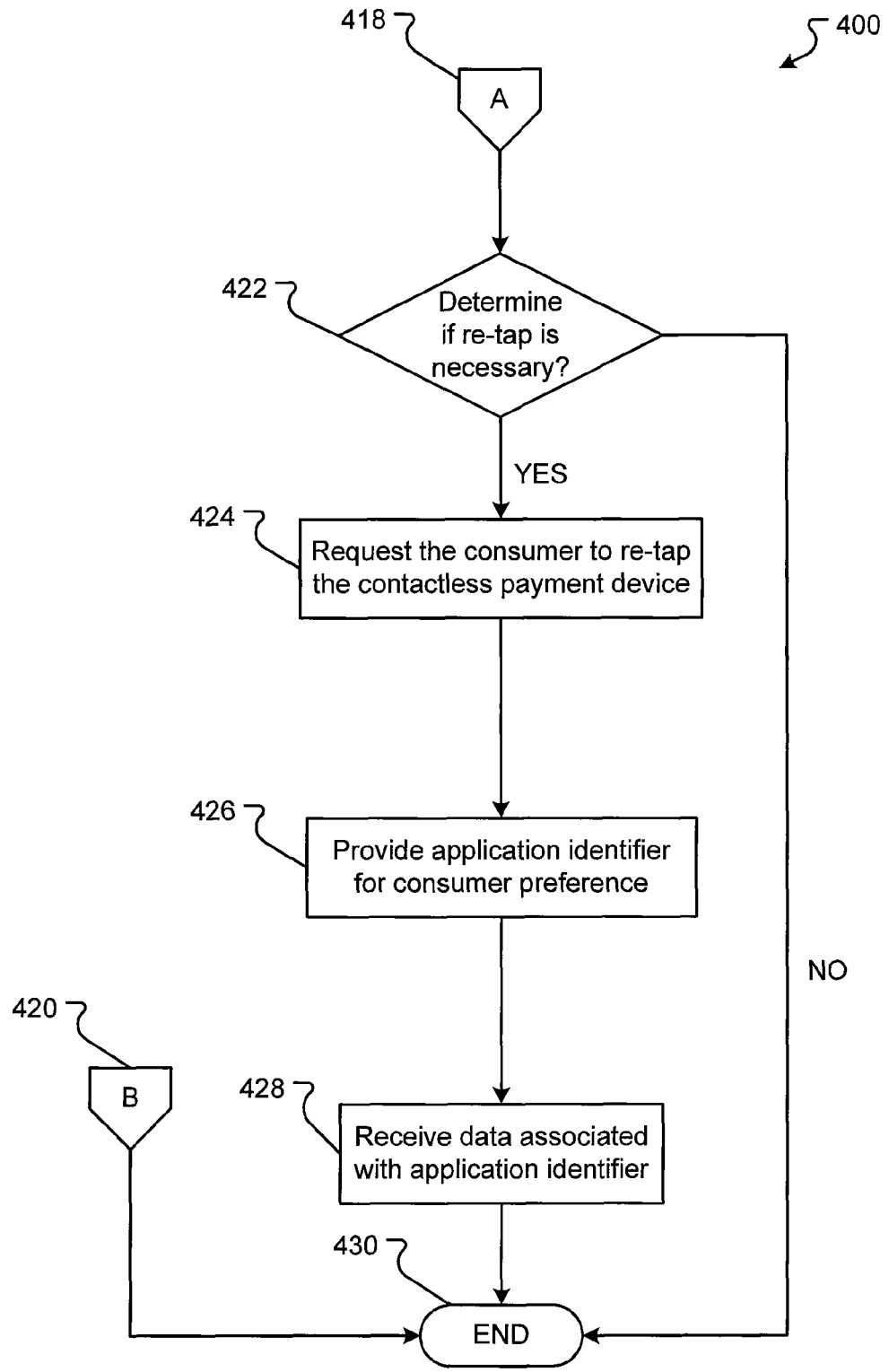

An embodiment of a method 400 for processing a transaction with a contactless payment device having two or more possible payment network options is shown in FIGS. 4A and 4B. The method 400 can describe the decision process of a preference processor 204 (FIG. 2A) in a merchant POS device 200 (FIG. 2A) and is described from the perspective of the merchant POS device 200 (FIG. 2A). In embodiments, the method 400 generally begins with a START operation 402 and terminates with an END operation 430. The steps shown in the method 400 may be executed in a computer system as a set of computer executable instructions. While a logical order is shown in FIGS. 4A and 4B, the steps shown or described can, in some circumstances, be executed in a different order than presented herein.

Receive operation 404 receive a request for a transaction. In embodiments, a consumer starts a check-out process with a merchant POS device 200 (FIG. 2A). The consumer may select one or more items on a user interface 202 (FIG. 2A) that indicate that a transaction is about to occur. For example, the consumer selects a touch screen icon that indicates the user want to complete a self-checkout from a grocery store. In other embodiments, a salesperson can select a user interface item to start the transaction.

Determine operation 406 determines if the consumer selected a transaction type before tapping the contactless payment device 102 (FIG. 1). In embodiments, the user input receiver/display manager 212 (FIG. 2B) may create a display for the user interface 202 (FIG. 2A) after the transaction begins. The display can ask the consumer what type of transaction the consumer desires. For example, the display can ask if the consumer desires a debit or a credit transaction. In alternative embodiments, no display is provided and the consumer enters the indication of the type of transaction without solicitation. In still other embodiments, no display is provided, and the consumer makes no indication of the type of transaction. If the user does not indicate the type of transaction, the method 400 flows NO to retrieve operation 410. If the user does not indicate the type of transaction, the method 400 flows YES to provide operation 408.

Provide operation 408 provides the application identifier 314 (FIG. 3) for the consumer's preference. In embodiments, the consumer selects debit or credit on the user interface 202 (FIG. 2A) of the merchant POS device 200 (FIG. 2A). For example, the user selects the debit icon on the video display of a grocery store register. In embodiments, the choice by the consumer is associated with an application identifier 314 (FIG. 3). In response to the selection, the merchant POS device 200 (FIG. 2A) sends the application identifier 314 (FIG. 3) for the application 306 or 310 (FIG. 3) associated either with credit transactions or debit transactions, as selected by the consumer, to the contactless payment device 102 (FIG. 1). In embodiments, the application identifier 314 (FIG. 3) is code that identifies the application type (debit or credit) for the contactless payment device 102 (FIG. 1). In embodiments, the application identifier 314 (FIG. 3) for each application 306 or 310 (FIG. 3) is the same for every contactless payment device 102 (FIG. 1).

Retrieve operation 410 retrieves the merchant preference. In embodiments, the merchant POS device 200 (FIG. 2A) accesses a merchant preference database 208 (FIG. 2A). For example, the preference processor 204 (FIG. 2A) sends a signal to a storage medium storing the merchant preferences in the merchant preference database 208 (FIG. 2A). The storage medium responds by sending the merchant preference associated with the received signal. In embodiments, the rules engine 214 (FIG. 2B) accesses the merchant preferences database 218 (FIG. 2B) by querying the merchant preferences database 218 (FIG. 2B) for the merchant preference and receiving the query response. In embodiments, the merchant preference is associated with or is an application identifier 314 (FIG. 3).

Provide operation 412 provides the application identifier 314 (FIG. 3) for the merchant's preference. In response to the retrieving the merchant preference, the merchant POS device 200 (FIG. 2A) sends the application identifier 314 (FIG. 3) for the application 306 or 310 (FIG. 3) associated either with credit transactions or debit transactions, as preferred by the merchant, to the contactless payment device 102 (FIG. 1). In embodiments, the application identifier 314 (FIG. 3) is code that identifies the application type (debit or credit) for the contactless payment device 102 (FIG. 1). In embodiments, the application identifier 314 (FIG. 3) for each application 306 or 310 (FIG. 3) is the same for every contactless payment device 102 (FIG. 1).

Receive operation 414 receives data associated with the application identifier 314 (FIG. 3). In embodiments, the contactless reader 206 (FIG. 2A) receives application data 315 (FIG. 3) from the contactless payment device 102 (FIG. 1). The contactless reader/transmitter 216 (FIG. 2B) of the merchant POS device 200 (FIG. 2A) may receive the communication. The application data 315 can be any data needed from the contactless payment device 102 (FIG. 1) to complete the transaction. Application data 315 can include account numbers, the consumer's information, an issuing institution for the contactless payment device 102 (FIG. 1), etc.

Determine operation 416 determines if a consumer selected a transaction type after the first tap. In embodiments, after the user taps the contactless payment device 102 (FIG. 1) a first time, the user input receiver/display manager 212 (FIG. 2B) may create a display for the user interface 202 (FIG. 2A). The display can ask the consumer what type of transaction the consumer desires. For example, the display can ask if the consumer desires a debit or a credit transaction. In alternative embodiments, no display is provided, and the consumer enters the indication of the type of transaction without solicitation after the first tap. If the user does not indicate the type of transaction, the method 400 flows NO to terminate at the end operation 430 through page connector B 420. If the user does indicate the type of transaction, the method 400 flows YES to determine operation 422 through page connector A 418.

Determine operation 422 determines if a re-tap is necessary. A re-tap is a second or more tap of the contactless payment device 102 (FIG. 1) after one or more past taps. Again, a tap can mean presenting the contactless payment device 102 (FIG. 1) within proximity to the contactless reader 206 (FIG. 2A) to allow the contactless reader 206 (FIG. 2A) and the contactless payment device 102 (FIG. 1) communicate. The preference processor 204 (FIG. 2A) can determine if a re-tap is necessary. In embodiments, the rules engine 214 (FIG. 2B) determines if a previous tap was accomplished and the information provided from the contactless payment device 102 (FIG. 1). In embodiments, a consumer may have tapped the contactless payment device 102 (FIG. 1) and the application data 315 (FIG. 3) received was according to the merchant's preference. Subsequently, the consumer may choose a preference for the type of transaction. If the merchant preference and the consumer preference are the same, the application data 315 (FIG. 3) received from the past tap can be used to complete the transaction. In contrast, if the merchant preference and the consumer preference are different, the consumer may need to re-tap the contactless payment device 102 (FIG. 1). The re-tap allows the contactless reader 206 (FIG. 2A) to read the application data 315 (FIG. 3) from the contactless payment device 102 (FIG. 1) for the type of transaction desired by the consumer.

Table 1 below shows the decision rules for the rules engine 214 (FIG. 2B) in different situations.

TABLE 1

Decision Table for Rules Engine

| Consumer Preference | Legacy POS Device Merchant Preference Credit | Upgraded POS Device Merchant Preference Debit | Upgraded POS Device Merchant Preference Credit |
|---|---|---|---|
| Before Tap | | | |
| No Choice Made | Credit | Debit | Credit |
| Debit | Credit | Debit | Debit |
| Credit | Credit | Credit | Credit |
| After Tap | | | |
| Debit | Credit | Debit | Re-Tap/Debit |
| Credit | Credit | Re-Tap/Credit | Credit |

If the merchant POS device 200 (FIG. 2A) is not capable of reading the application data 315 (FIG. 3) from two or more applications 306 and/or 310 (FIG. 3) of a contactless payment device 102 (FIG. 1), the rules are as shown in the "Legacy POS Device" column. If the merchant POS device 200 (FIG. 2A) has been upgraded to provide application identifiers 314 (FIG. 3) and read data from two or more applications on the contactless payment device 102 (FIG. 1), the rules are as shown in the "Upgraded POS Device" portion of Table 1. In embodiments, "Credit" means that a credit transaction is preferred by the merchant or consumer and "Debit" means a debit transaction is preferred by the merchant or consumer. "No Choice Made" can mean the consumer did not provide a preference. "Before Tap" can mean the consumer provided a preference before a first tap of the contactless payment device 102 (FIG. 1). "After Tap" can mean the consumer provided a preference after a first tap of the contactless payment device 102 (FIG. 1).

If a re-tap is necessary, the method 400 flows YES to request operation 424. If no re-tap is necessary, the method flows NO to end operation 430. Request operation 424 requests a re-tap of the contactless payment device 102 (FIG. 1). In embodiments, the consumer selects debit or credit on the user interface 202 (FIG. 2A) of the merchant POS device 200 (FIG. 2A) after a first tap. For example, the user selects the debit icon on the video display of a grocery store register. In embodiments, the choice by the consumer is associated with an application identifier 314 (FIG. 3). If a re-tap is necessary, the user interface 202 (FIG. 2A) requests the consumer to re-tap the contactless payment device 102 (FIG. 1). In embodiments, the rules engine 214 (FIG. 2) sends a signal to the contactless reader/transmitter 216 (FIG. 2) to send the application identifier 314 (FIG. 3) for the application 306 or 310 (FIG. 3) associated either with credit transactions or debit transactions, as selected by the consumer, to the contactless payment device 102 (FIG. 1). The signal, in embodiments, is sent to the contactless reader/transmitter 216 (FIG. 2) before the consumer re-taps the contactless payment device 102 (FIG. 1).

Provide operation 426 provides an application identifier 314 (FIG. 3) for the consumer preferred application. During the re-tap, the contactless reader/transmitter 216 (FIG. 2) sends the application identifier 314 (FIG. 3) to the contactless payment device 102 (FIG. 1) for the application identifier 314 (FIG. 3) by the rules engine 214 (FIG. 2). Receive operation 428 receives application data 315 (FIG. 3) associated with the application identifier 314 (FIG. 3). In embodiments, the contactless reader 206 (FIG. 2A) receives application data 315 (FIG. 3) from the contactless payment device 102 (FIG. 1). The contactless reader/transmitter 216 (FIG. 2B) of the merchant POS device 200 (FIG. 2A) may receive the communication. The application data 315 (FIG. 3) can be any data needed from the contactless payment device 102 (FIG. 1) to complete the transaction. Application data 315 (FIG. 3) can include account numbers, the consumer's information, an issuing institution 110 and/or 120 (FIG. 1) for the contactless payment device 102 (FIG. 1), etc.

Figure 5:
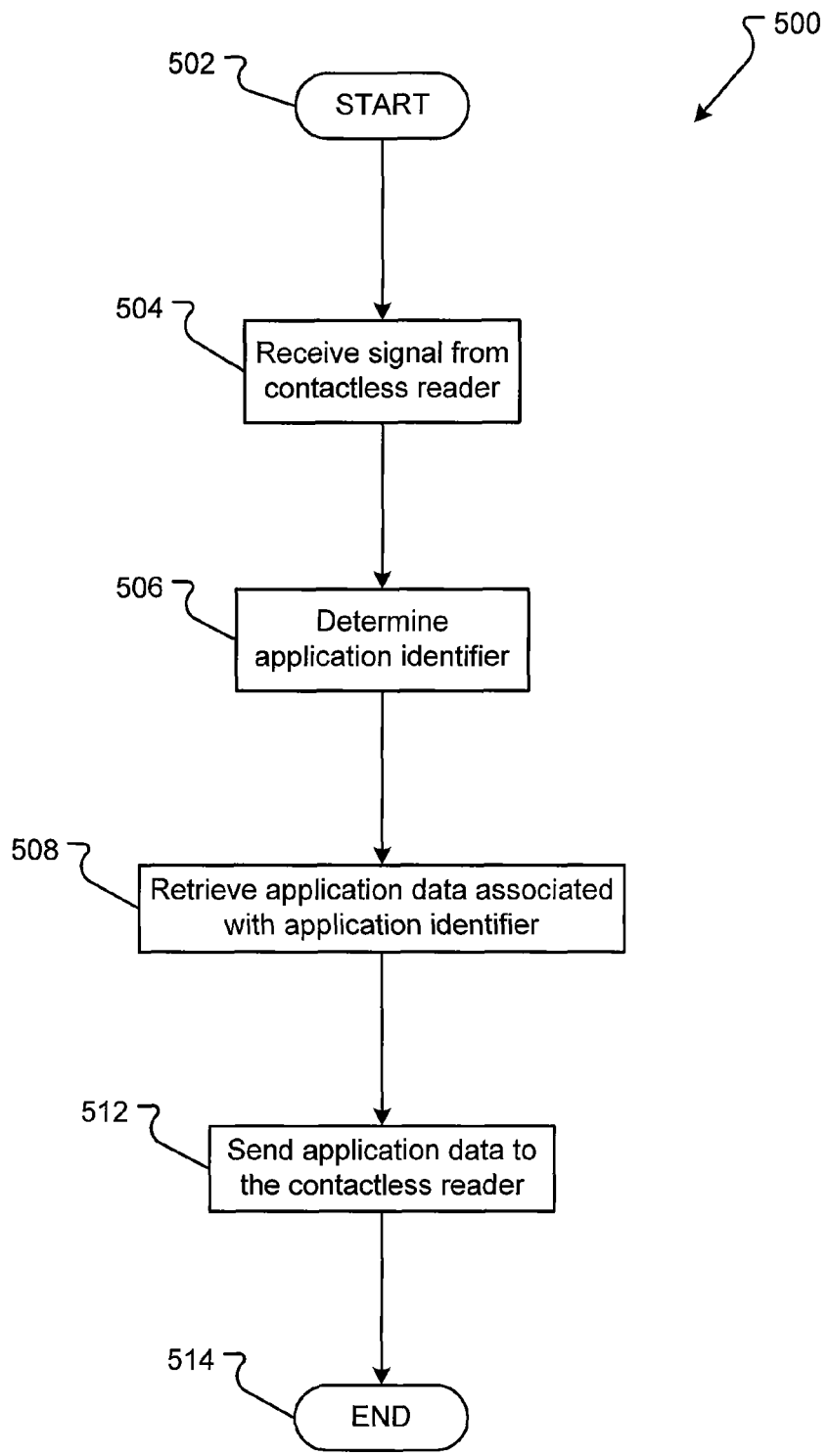
FIG. 5 is a flow diagram of another embodiment of a method for processing an electronic transaction having the option of two or more payment networks.

An embodiment of a method 500 for providing application data 315 (FIG. 3) from a contactless payment device 102 (FIG. 1) having two or more possible payment network 110 and/or 120 (FIG. 1) options is shown in FIG. 5. The method 500 can describe the decision process of a base software 302 (FIG. 3) in a contactless payment device 300 (FIG. 3) and is described from the perspective of the contactless payment device 102 (FIG. 1). In embodiments, the method 500 generally begins with a START operation 502 and terminates with an END operation 514. The steps shown in the method 500 may be executed in a computer system as a set of computer executable instructions. While a logical order is shown in FIG. 5, the steps shown or described can, in some circumstances, be executed in a different order than presented herein.

Receive operation 504 receives a signal from the contactless reader 206 (FIG. 2). In embodiments, the NFC device application 304 (FIG. 3) receives a signal 314 and/or 315 (FIG. 3) from the contactless reader 206 (FIG. 2A). The signal 314 and/or 315 (FIG. 3) may be a radio frequency signal that provides power to the contactless payment device 300 (FIG. 3) and may include one or more items of data or one or more requests. In embodiments, the NFC device application 304 (FIG. 3) receives a request 314 and/or 315 (FIG. 3) for application data 315 (FIG. 3). The request 314 and/or 315 (FIG. 3) may include a header or footer and the application identifier 314 (FIG. 3). The NFC device application 304 (FIG. 3), in embodiments, forwards the request to the operation system 308 (FIG. 3) and/or to the base software 302 (FIG. 3).

Determine operation 506 determine the application identifier 314 (FIG. 3). The operations system 308 (FIG. 3) or the base software 302 (FIG. 3) can extract the application identifier 314 (FIG. 3) from the request. In embodiments, the request is parsed to extract the application identifier 314 (FIG. 3). In other embodiments, the application identifier 314 (FIG. 3) is the only data in the request and the request need not be parsed or transformed. The base software 302 (FIG. 3) can then determine to which application 306 or 310 (FIG. 3) the application identifier 314 (FIG. 3) is associated. In embodiments, the base software 302 (FIG. 3) includes a memory that stores a database, which associated the application identifiers 314 (FIG. 3) with the applications. For example, if the application identifier #1 [#?] is received, the base software 302 (FIG. 3) can search for application identifier #1 [#?] in the database and determine that application identifier #1 [#?] is associated with application #1 306 (FIG. 3). The base software 302 (FIG. 3), after determining the associated application 306 or 310 (FIG. 3), sends a signal to the application 306 or 310 (FIG. 3) to provide data.

Retrieve operation 508 retrieves application data 315 (FIG. 3) associated with the determined application identifier 314 (FIG. 3). Herein, the procedure for retrieving data will be explained with respect to application #1 306 (FIG. 3), but one skilled in the art will recognize how the procedure can be modified for application #2 310 (FIG. 3). In embodiments, application #1 306 (FIG. 3) receives the signal from the base software 302 (FIG. 3) to provide application data 315 (FIG. 3). The application #1 306 (FIG. 3) can then retrieve the application data 315 (FIG. 3) from the application #1 datastore 312 (FIG. 3). In embodiments, the application #1 306 (FIG. 3) queries the database 312 (FIG. 3) and is provided the application data 315 (FIG. 3). In other embodiments, the application #1 306 (FIG. 3) reads all or one or more portions of the application data 315 (FIG. 3) from the application #1 datastore 312 (FIG. 3). The application #1 306 (FIG. 3) may then provide the application data 315 (FIG. 3) to the NFC device application 304 (FIG. 3), the base software 302 (FIG. 3), or the operating system 308 (FIG. 3). Regardless of the component that receives the application data 315 (FIG. 3) from the application #1 306 (FIG. 3), the application data 315 (FIG. 3) can be forwarded to the NFC device application 304 (FIG. 3).

Send operation 512 sends application data 315 (FIG. 3) to the contactless reader 206 (FIG. 2). In embodiments, the NFC device application 304 (FIG. 3) sends the application data 315 (FIG. 3) to the NFC sensor application 316 (FIG. 3). The NFC sensor application 316 (FIG. 3) can represent the contactless reader 206 (FIG. 2A) and/or the contactless reader/transmitter software 216 (FIG. 2B). The NFC device application 304 (FIG. 3) can send a signal to the contactless reader 206 (FIG. 2A) that can have a header, a footer, and/or the application data 315 (FIG. 3). The entire method 500 can take only milliseconds and is completed while the consumer is tapping the contactless payment device 102 (FIG. 1) to the merchant POS device 104 (FIG. 1).

Figure 6:
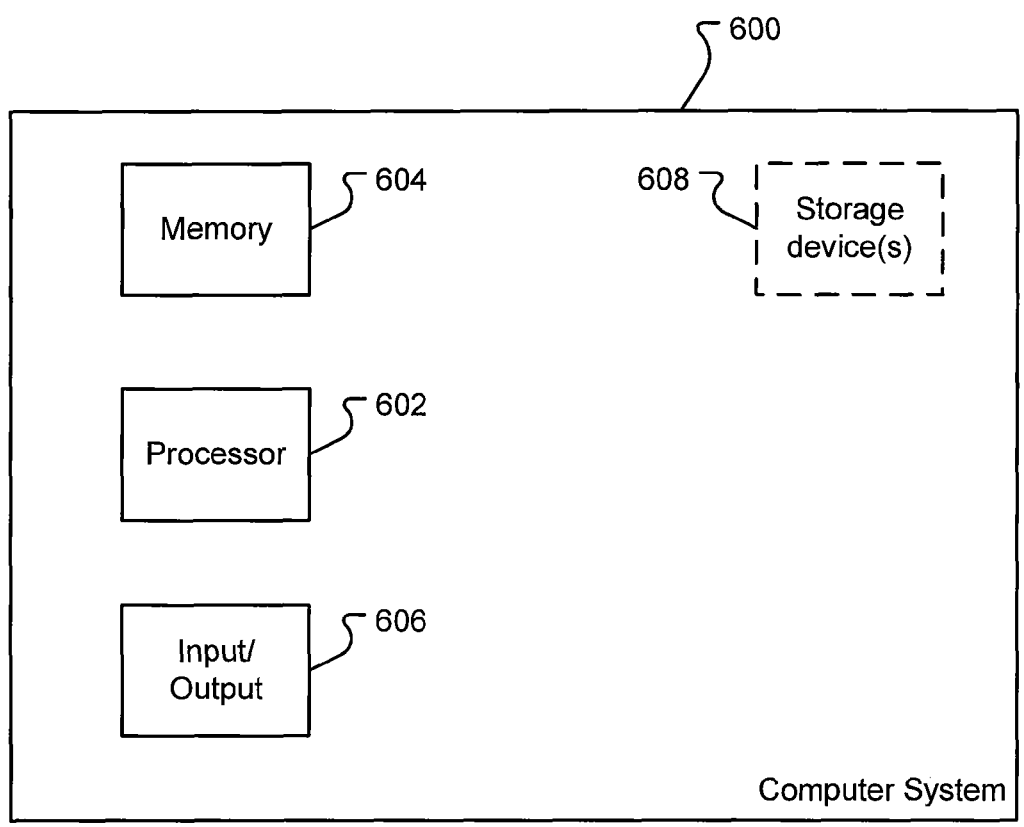
FIG. 6 is a block diagram of an embodiment of a computer system operable as one or more components described herein.

An embodiment of a computer system 600 operable to function as one or more components or systems described herein, such as the contactless payment device 102 (FIG. 1) or the merchant POS device 104 (FIG. 1) is shown in FIG. 6. In embodiments, the computer system 600 comprises a processor 602 for executing one or more instructions in software stored on computer-readable medium, such as memory 604 or storage device(s) 608. The instructions may perform a method, such as methods described in conjunction with FIGS. 4A-4B and 5. The processor 602 may be the same or similar to the preference processor 204 (FIG. 2A) or to the processor operating in the contactless payment device 300 (FIG. 3). The computer system 600, in embodiments, also includes Input/Output (I/O) devices or components 606. The I/O components 606 can include network interface cards, routers, hardware for communicating with peripherals (e.g., printers, monitors, etc.), software drivers, NFC components, or any other hardware or software needed to receive or send information as described herein.

The computer system 600 can also comprise software elements located within the working memory 604, including an operating system (the same or similar to operating system 308 (FIG. 3)) and/or other code, such as one or more application programs, which may comprise computer programs as described herein, and/or may be designed to implement methods and/or configure systems, as described herein. Merely by way of example, one or more procedures described with respect to the method(s) discussed above might be implemented as code and/or instructions executable by a computer (and/or a processor within a computer).

A set of these instructions and/or code might be stored on a computer-readable storage medium, such as the storage device(s) 608 described above. In some cases, the storage medium might be incorporated within a computer system, such as the merchant preferences database 208 (FIG. 2A) and/or the application #1 datastore 312 (FIG. 3). In other embodiments, the storage medium might be separate from the computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

While various aspects of embodiments of the disclosure have been summarized above, the following detailed description illustrates exemplary embodiments in further detail to enable one of skill in the art to practice the disclosure. In the preceding description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form. Several embodiments of the disclosure are described above, and while various features are ascribed to different embodiments, it should be appreciated that the features described with respect to one embodiment may be incorporated with another embodiment as well. By the same token, however, no single feature or features of any described embodiment should be considered essential to the disclosure, as other embodiments of the disclosure may omit such features.

Specific details are given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein, as explained in conjunction with FIG. 6.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a software component, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

In light of the above description, a number of advantages of the present disclosure are readily apparent. For example, the consumer may now use a contactless payment device 102 (FIG. 1) that allows for two or more types of transactions. The type of transaction informs the payment network 114 and/or 116 (FIG. 1) that will be used for a transaction. Thus, the consumer can choose under which rules of the different payment networks the consumer will conduct the transaction. The differences to the consumer may include entering a PIN rather than signing his or her name. The merchant can also impart preferences for the payment network to use rather than having to use a single payment network 114 and/or 116 (FIG. 1) (as was the case with previous contactless payment devices). While the consumer's choice will supersede the merchant's choice, the merchant may still be able to inform the decision of the consumer or choose the payment network 114 and/or 116 (FIG. 1) if the consumer does not choose. The flexibility of the system allows for more satisfaction from both the merchant and the consumer. If fees are different for the different payment networks 114 and/or 116 (FIG. 1), the merchant may also be able to lower costs.

A number of variations and modifications of the disclosure can also be used. For example, the contactless payment device 102 (FIG. 1) could send all the application data 315 (FIG. 3) (e.g., application #1 data 312 and application #2 data 318 (FIG. 3)) in a single transmission. The merchant POS device 104 (FIG. 1) could parse the data and only send the application data 315 (FIG. 3) required for the chosen transaction type. Unfortunately, the contactless payment device 102 (FIG. 1) generally advances a counter every time the contactless payment device 102 (FIG. 1) sends a set of application data 315 (FIG. 3). The counter's value is part of the application data 315 (FIG. 3) and is verified at the issuing institution 110 and/or 120 (FIG. 1). If the counter of the contactless payment device 102 (FIG. 1) and the issuing institution 110 and/or 120 (FIG. 1) is different, the issuing institution 110 and/or 120 (FIG. 1) may reject the transaction. Thus, sending application data 315 (FIG. 3) to the merchant POS device 104 (FIG. 1) but not to the issuing institution 110 and/or 120 (FIG. 1) may cause the counter to be different from the counter at the issuing institution 110 and/or 120 (FIG. 1) and cause rejected transactions. If the counter could be maintained, then sending all application data 315 (FIG. 3) may be a possible embodiment.

In another modification, all payment networks 114 and/or 116 (FIG. 1) and issuing institutions 110 and/or 120 (FIG. 1) may use the same data. In other words, regardless of the type of transaction, the same data in the application data 315 (FIG. 3) is used. Unfortunately, this standardization has various legal and contractual barriers that make the standardization unlikely.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the disclosure have been described above in connection with specific apparatuses and methods, it is to be clearly understood that this description is made only by way of example and not as limitation on the scope of the disclosure.

What is claimed is:

1. A method for processing a transaction between a consumer and a merchant, processing the transaction with a merchant POS device, the merchant POS device in communication with a contactless payment device, the method comprising:
   receiving a request for a transaction;
   retrieving from the merchant POS device a previously determined preferred payment network for the transaction based on a preference by the merchant, wherein the preferred payment network comprises a payment network selected from the group consisting of a debit payment network, a credit payment network, and a stored value payment network;
   providing an application identifier to the contactless payment device from the merchant POS device prior to receiving an application identifier or application information from the contactless payment device, wherein the application identifier is associated with the preferred payment network and is sent to the contactless payment device to indicate the application preference of the merchant prior to receiving application identifier information from the contactless payment device;
   receiving, from the contactless payment device, application data associated with the payment network preferred by the merchant; and
   completing the transaction with the application data.

2. The method as described in claim 1, further comprising:
   determining if the consumer selected a payment network before providing the application identifier;
   if the consumer did select a payment network, providing the application identifier associated with the consumer selection; and
   if the consumer did not select a payment network, providing the application identifier associated with the merchant preference.

3. The method as described in claim 1, further comprising:
   determining if the consumer selected a payment network after receiving, from the contactless payment device, application data associated with the application identifier;
   if the consumer did select a payment network and the consumer selection is different from the payment network associated with the provided application identifier sent to the contactless payment device, requesting the consumer to re tap the contactless payment device in response to the consumer's selection;
   providing the application identifier associated with the consumer selection;
   receiving application data associated with the application identifier associated with the consumer selection;
   completing the transaction with the applications data over the payment network selected by the consumer; and
   if the consumer did not select a payment network, completing the transaction with the application data already received over the payment network preferred by the merchant.

4. The method as described in claim 1, further comprising:
   the contactless payment device receiving a signal from the merchant POS device, the signal including the application identifier;
   the contactless payment device determining the application identifier;
   the contactless payment device retrieving the application data associated with the application identifier; and
   the contactless payment device sending the application data to the contactless reader.

5. The method as described in claim 4, repeating the steps of receiving, determining, retrieving, and sending during a re-tap.

6. The method as described in claim 4, wherein determining the application identifier includes determining which of two or more sets of application data is associated with the application identifier.

7. The method as described in claim 1, wherein the consumer makes no selection of a payment network and the application identifier associated with the merchant preference is sent to the contactless payment device.

8. A contactless payment device comprising:
   an operating system;
   an NFC application, the NFC application operable to receive a signal from an NFC sensor application, the signal including an application identifier from a merchant POS that is associated with a preferred payment network based on a merchant preference prior to sending an application identifier or application information to the merchant POS, the NFC application operable to send application data to the NFC sensor application, the application data associated with the application identifier;
   two or more application data databases, the application data databases storing application data;
   two or more applications, each application in communication with one of the application data databases and with the NFC application, the applications operable to retrieve application data from one of the application data databases and operable to send the application data to the NFC application, wherein a first application provides application data for a credit transaction and wherein a second application provides application data for a debit transaction, wherein the credit transaction is over a first payment network and the debit transaction is over a second payment network; and
   a base software in communication with the operating system, the NFC application, and the two or more applications, the base software operable to receive the application identifier from the NFC application, operable to associate the application identifier with one of the two or more applications, operable to send a signal to the application associated with the application identifier to retrieve application data.

9. The mobile device as described in claim 8, wherein the base software associates the application identifier with the application by querying a database.

10. The mobile device as described in claim 8, wherein the application identifier received is associated with a consumer selection.

11. A merchant POS device comprising:
   a user interface, the user interface operable to provide a display to a consumer during a transaction, the user interface operable to receive one or more inputs from the consumer during the transaction;
   a contactless reader, the contactless reader operable to send an application identifier to a contactless payment device during the transaction prior to receiving an application identifier or application information from the contactless payment device, the application identifier based initially on a previously determined preferred payment network of a merchant, the contactless reader operable to receive application data associated with the application identifier;

a merchant preferences database, the merchant preferences database storing one or more preferred payment networks for which payment network a merchant desires to use for a transaction, wherein the preferred payment network comprises a payment network selected from the group consisting of a debit payment network, a credit payment network, and a stored value payment network; and a preference processor in communication with the user interface, the contactless reader, and the merchant preferences database, the preference processor operable to determine from the user input or the one or more preferred payment networks which application identifier to provide to the contactless reader to send to the contactless payment device.

12. The merchant POS device as defined in claim 11, wherein a first application identifier is associated with a first payment network and a second application identifier is associated with a second payment network.

13. The merchant POS device as defined in claim 12, wherein the first payment network processes credit transactions and the second payment network processes debit transactions.

14. The merchant POS device as defined in claim 11, wherein the contactless reader comprises a contactless reader and transmitter software component that can send one or more application identifier to a contactless payment device and receive application data for one of two or more applications executable in the contactless payment device.

15. The merchant POS device as defined in claim 11, wherein the preference processor executes a rules engine software component, the rules engine software component determining whether to send a first application identifier or a second application identifier to the contactless reader;

wherein the rules engine sends the first application identifier if:

a merchant preference is for a credit transaction and the consumer made no selection for a type of transaction;

both the merchant preference and the consumer selection is for a credit transaction;

the merchant preference is for a debit transaction but the consumer selects a credit transaction;

wherein the rules engine sends the second application identifier if:

the merchant preference is for a debit transaction and the consumer made no selection for a type of transaction;

both the merchant preference and the consumer selection is for the debit transaction; and the merchant preference is for a credit transaction but the consumer selects a debit transaction.

16. The merchant POS device as defined in claim 11, wherein if first application data is received after sending a first application identifier, if the first application identifier is associated with a merchant preference, and if the consumer subsequently selects a different type of transaction from the merchant preference, the user interface requesting a re-tap of the contactless payment device and the rules engine sending a second application identifier to the contactless reader to send to the contactless payment device during the re-tap.

* * * * *